United States Patent [19]

D'Ascenzo

[11] Patent Number: 4,471,227

[45] Date of Patent: Sep. 11, 1984

[54] ELECTRONIC ADDRESSING SYSTEM TO READ MOSAIC MATRICES OF OPTICAL-ELECTRONIC ELEMENTS

[75] Inventor: Enrico D'Ascenzo, Rome, Italy

[73] Assignee: Electtronica, S.p.A., Italy

[21] Appl. No.: 226,257

[22] Filed: Jan. 19, 1981 (Under 37 CFR 1.47)

Related U.S. Application Data

[63] Continuation-in-part of Ser. No. 055,919, Jul. 9, 1979, abandoned.

[30] Foreign Application Priority Data

Jul. 12, 1978 [IT] Italy .................................. 50260/78

[51] Int. Cl.³ ....................... H04N 3/12; H04N 3/14; H01L 27/14
[52] U.S. Cl. ..................................... 250/578; 357/32; 358/212; 340/782; 340/825.95
[58] Field of Search ................ 250/578, 211 R, 211 J; 358/212, 213; 357/24 LR, 30, 31, 32; 340/166 R, 782, 825.94, 825.95

[56] References Cited

U.S. PATENT DOCUMENTS

| | | | |
|---|---|---|---|
| 3,165,634 | 1/1965 | Raymond | 250/578 X |
| 3,189,877 | 6/1965 | Pricer et al. | 340/825.95 X |
| 3,536,829 | 10/1970 | Gebel | 250/211 R X |
| 3,539,995 | 11/1970 | Brandt | 250/578 X |
| 3,696,393 | 10/1972 | McDonald | 340/782 |
| 4,011,441 | 3/1977 | Michon et al. | 250/211 J X |

*Primary Examiner*—David C. Nelms
*Assistant Examiner*—Edward P. Westin
*Attorney, Agent, or Firm*—Jacobs & Jacobs

[57] ABSTRACT

An electronic addressing system to read matrices of optical-electronic elements, wherein the optical-electronic elements are of any type, for example photoresistors, photodiodes, light emitters, and the like. The matrices are bi-dimensional and comprise optical-electronic elements arranged according to a row-column structure, without any auxiliary switching an/or commutating means connected therewith. One end of each one of the elements is connected with a corresponding row near each row-column crossover, and the other end is connected with the column related to the crossover. The switching of each one of the optical-electronic elements which is addressed for reading is obtained by an adaptive analog compensation technique, whereby only a single element is read out while all other elements are electrically isolated.

13 Claims, 3 Drawing Figures

ELECTRONIC ADDRESSING SYSTEM TO READ MOSAIC MATRICES OF OPTICAL-ELECTRONIC ELEMENTS

This application is a continuation-in-part of a previous application having Ser. No. 055,919 filed July 9, 1979, now abandoned.

The present invention relates to an electronic addressing system to read mosaic matrices of optical-electronic elements of any type, for example sensors, light emitters, photodiodes, photoresistors and the like, which have a substrate of any dielectric material. The system is mainly characterized in being able to carry out addressing in a very short time, even in the case of elements having a very high impedance ($>>1M \Omega$), without auxiliary physical switching elements, and can read out mono- or bidimensional matrices of any type, having any number of elements to be addressed.

When, for example, reading is limited to sensor or detector mosaics, it is known that possible solutions relating to addressing mosaics of sensors have until now been limited to arrays of solid state sensors which are provided with a silicon substrate (or the like), wherein an auxiliary element having the characteristics of a switch (e.g. a diode, a MOS transistor, etc.) is used to insulate the selected sensor from the surrounding sensors by addressing the row-column cross-over position of the sensor to be addressed. Technicians and scientists have, for example, made modern image systems in solid state by using phototransistors of silicon oxide semiconductors (MOS), and in consequence of the high ON-OFF conduction ratio which is possible with field-effect transistors, a self-scanned ("integrated") commutation has been obtained (see M. H. Crowell et al, Bell Syst. Techn. J., 46, 491-1967).

The most recent example of self-scanned commutation is due to the charge transfer scanning systems by silicon image systems which have many future possibilities. These structures, wherein a capacitor of MOS type is provided in a simple manner through a structure silicon-dielectric-metal gate, may be used as an integrating photoelement similarly to a photodiode (see M. H. Boyle & G. Smith, Bell Syst. Techn. J., 49, 587-1970). This photosensitive region is obtained by polarization of the metal gate in order to remove the free charges from the semiconductor surface. The so-called minority charges, which are provided by the active radiation under this structure, may be shifted sideways towards an adjacent electrode by using a clock voltage, and on the other hand this latter is able to maintain the depletion condition of the majority charges all over the semiconductor surface.

This solution has, however, some limitations and drawbacks regarding its practical utilization. The limited applicability is principally due to the fact that such a solution is possible only when materials having proper characteristics of dielectric-semiconductor surface charges are used, and these materials, apart from silicon, are difficult to find. A first important disadvantage is the loss of transfer efficiency when the number of sensors increases (the sensors being the selected representative example of optical-electronic elements included in the field of the present invention, as said above, while a further disadvantage is the dispersion of information in the blooming contour.

In the particular case of bi-dimensional mosaics, wherein the elements comprise sensors of infrared radiation, and when devices are used for which a cryogenic cooling is necessary, then it is particularly desirable and important to provide electrical scanning elements which are arranged outside the substrate wherein the photoelements have been provided. Namely, great importance is to be attributed to the possibility of providing an addressing system of the single elements with an electronic reading which may be set in any desired place.

The attention of the skilled in the art has already been devoted to the solving of such a problem considered at first sight very difficult because of the necessity to provide insulating elements in a dynamic sense between the element to be read and those other elements which are arranged around same. That is to say, no alternative solution has until now been found with respect to the above considerations.

A main object of the present invention is to provide an electronic reading system arranged outside the matrix of optical-electronic elements to be scanned, wherein the matrix comprises any number of elements.

Another object of the present invention is to allow the reading of a mosaic matrix of optical-electronic elements (which may be sensors of radiation in order to simplify the description and illustrate an exemplary embodiment) the number of which may be very high, such a matrix using any desired dielectric material as a substrate, and following any desired technology, which utilizes electrodes having a row-column structure.

A further object of the present invention is to provide such a mosaic matrix which comprises photosensitive elements only; that is, a mosaic wherein no insulating element is used.

A still further object of the present invention is to provide a circuit which allows the sequential scanning of matrix structures of above type with very high performance relating to: the electronic insulation between the one selected sensor and the other sensors; the intrinsic noise of the electronic circuitry; and, the reading speed.

Another object of the present invention is to provide a relatively simple reading method which allows the arrangement of the greatest amount of active elements (particularly the pre-amplification units) in the immediate proximity of the sensor matrix.

From the previous statement referring to the present technique in the field of reading and addressing of matrices of optical-electronic elements, as well as from the above objects of the present invention, it should be easy to the skilled in the art to understand advantages of such a practical realization which may overcome the limitations and drawbacks which have been proposed until now by present technology. In order that the invention may be better understood in relation to its most important innovative characteristics, an embodiment of same will now be described with reference to the accompanying drawings. The description refers to an illustrating exemplary embodiment of the invention and is not to be intended as a limitation thereof. Modifications and/or changes may be made by the skilled in the art when supposed as more suitable for particular applications. And these modifications and/or changes are also to be included within the scope of the claims when based on the ground principles of the invention.

DESCRIPTION OF THE DRAWINGS

Referring now to the drawings, FIG. 1 shows a schematic partial view of a matrix 10 of units 11 of sensors 12 with respective insulating element 13 according to a conventional manner, the connections in a row-columns structure having a sequence of rows a, b, c, . . . and columns A, B, C, . . . wherein each unit generally indicated by the reference numeral 11 is substantially formed by a resistive element $R_{a-A}$, $R_{a-B}$, . . . $R_{b-A}$, $R_{b-B}$ . . . as well as by a corresponding insulating element or switch $S_{a-A}$, $S_{a-B}$ . . . , $S_{b-A}$, $S_{b-B}$ . . . .

A set of like resistive elements $R_L$ is provided at the end of each row a, b, . . . as a part of row selector (reading circuit) A1, with node $X_a$, $X_b$ . . . preceding said resistive elements $R_L$ of each row as a point which is suitable to take out the information from a sensor $R_{i-K}$ having one end connected with row i, while its other end is connected with an insulating element $S_{i-K}$, which in turn is connected with column K. All the columns have their ends in column selector (addressing circuit) B1.

Figure 1:
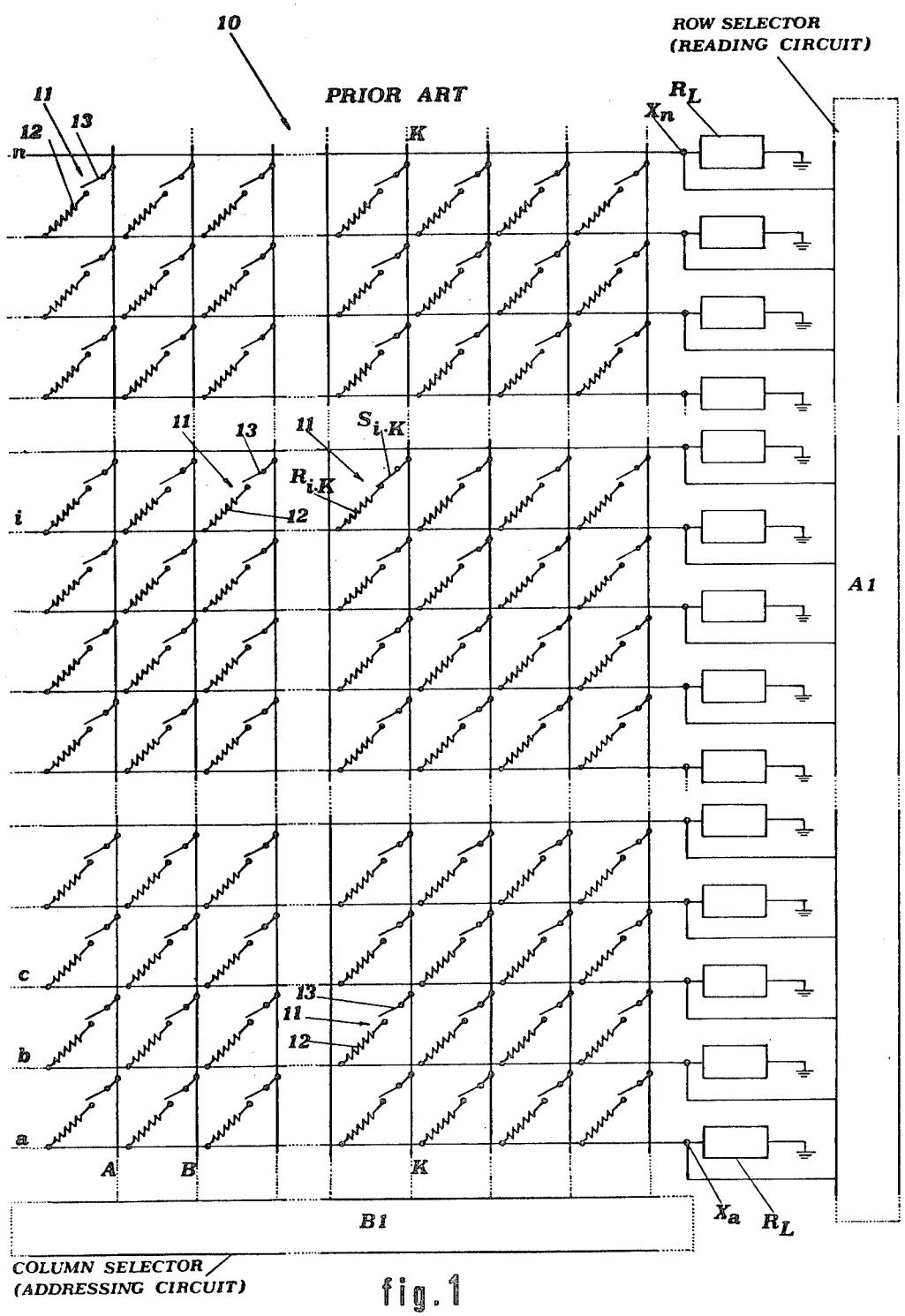
FIG. 1 is a schematic diagram of a prior art system for the electronic reading of a sensor matrix of radiation sensors of the photoresistive type, having a row-column structure, each photoresistive element having a series connection with an insulating element according to conventional manner.

The problem of reading out information from sensor $R_{i-K}$ of a photoresistive type as hereabove supposed is actually very complex, above all in the case of high intrinsic impedance, which in addition is almost always real. This complexity is above all due to the insulating elements $S_{i-K}$ which follows the respective photoresistive element $R_{i-K}$ in accordance with the techniques of the present time, as schematically shown in FIG. 1.

Figure 2:
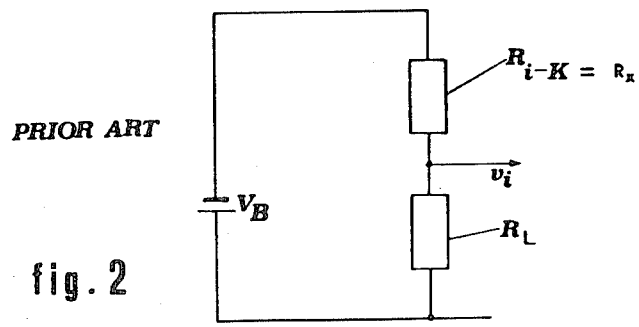
FIG. 2 is a simple prior art circuit of an electronic system to read a conventional matrix as shown in FIG. 1.

A very simple but functional circuit has been used satisfactorily, a diagram of which is shown in FIG. 2. The following characters are used, namely: $R_L$ the load resistor having a common value and referred to resistive elements of the information circuit; $R_x$ the resistance of the addressed photoresistive element; $V_B$ the supply voltage; $v_i$ the information voltage. It is first of all possible to say that the maximum sensitivity is obtained when $R_L = R_x$. In these conditions, the partial differential of the information voltage is maximum and may be deduced from the following equation:

$$\frac{v_i}{R_x} \times dR_x = -\frac{V_B}{4R_x} dR_x$$

There are, however, some actual limitations to selecting $R_L = R_x$ which depend on the noise as well as on the very high impedance that the acquisition system of the analog datum must have. Furthermore, a notable limitation is due to the response time of the impulsive excitation system which could probably set up the main aspect of the problem.

Such a simple arrangement cannot have the possibility of an immediate accomplishment because of the huge complexity resulting from the increase in the number of sensors, so that the request of the users is opposed. Actually, research on information in sensor mosaics should be directed to matrices having a very high number of sensors in respect to the present technique, even greater than 1000.

Sensor structures are arranged in a matrix (n×m), wherein the limited number of wires (the main source of circuit complexity) is evidenced. This relative simplicity is found in the construction of a planar structure having photoresistive elements deposited upon a substrate of any type and connected as differentiated bus which are just forming the characteristic row and column wires, so that one or more wires may be used as a path to transmit the information from any of the many sources to any of many destinations.

To this innovative purpose of the present invention, i.e. the use of matrixes having high density with (n×m) sensors, another feature has been added which relates to the acquisition of the necessarily sequential information voltage $v_i$, by insulating [n×(m−1)] sensors in a desired moment $t_i$. That is to say, no information is requested of these sensors, while only sensor $R_{i-K}$ is addressed, as only this latter is considered important for reading purposes in the moment $t_i$.

Such an acquisition of information voltage $v_i$ has been an object of analysis and research by those skilled in the art, but considered however as a problem which is substantially not resolvable. A not so valid solution concerns, for example, the arrangement of as many junctions (p-n) on a silicon substrate as there are photosensitive elements, in order to embody a matrix of diodes, each one in series connection with a corresponding photosensor, the photosensors being, in turn, provided by a process of deposition upon another insulating substrate which is placed above said diodes.

It will be evident to those skilled in the art that such a method could be possible for sensor mosaics having only a limited density. Moreover, a very long stabilization time will be needed because of the high impedance of the sensors, so that the equivalent time constants will be very long, while using diodes having low doping junctions and consequently limited capacities of transition.

There have been two possible solutions suggested by techniques until now for systems of photoresistive sensors of radiation, both solutions having however a low degree of functionality. According to a first solution, a simple diagrammatic circuit of which is shown in FIG. 2., it is necessary to repeat (n×m) times said simple circuit. This shows that the efficiency of the addressing system is limited to mosaics having a rather low sensor number, no more than one hundred. As a matter of fact, when this number is increased, the structure complexity will also be increased in a drastic manner, which is in contrast with what has been reported above. In the second prior art solution, an arrangement is provided of the (n×m) matrix sensors, wherein each sensor is connected in series with a diode to obtain a sufficient electric insulation, like the symbolic illustration in FIG. 1. Notable disadvantages are also found in this second solution, namely: intrinsic limitations of the scanning velocity; complexity of the technological realization; and lack of practical convenience in using photoresistive elements only, which are produced upon silicon substrates.

The present invention finally solves the above problems in a completely novel manner.

First of all, there is provided an array of (n×m) sensors in a matrix, wherein (m−1) sensors of each matrix row which are not addressed for information at a desired moment $t_i$ have a positive feedback. This is for the purpose of making their output equal to zero and for stabilizing the response to the incident radiation in a very short time. The stabilization time is essentially dependent on static parameters.

The basic diagram of such a matrix as well as the provided systems of amplification, commutation and feeding to allow the addressing and reading of the apparatus will be described hereafter, with reference to FIG. 3.

Figure 3:
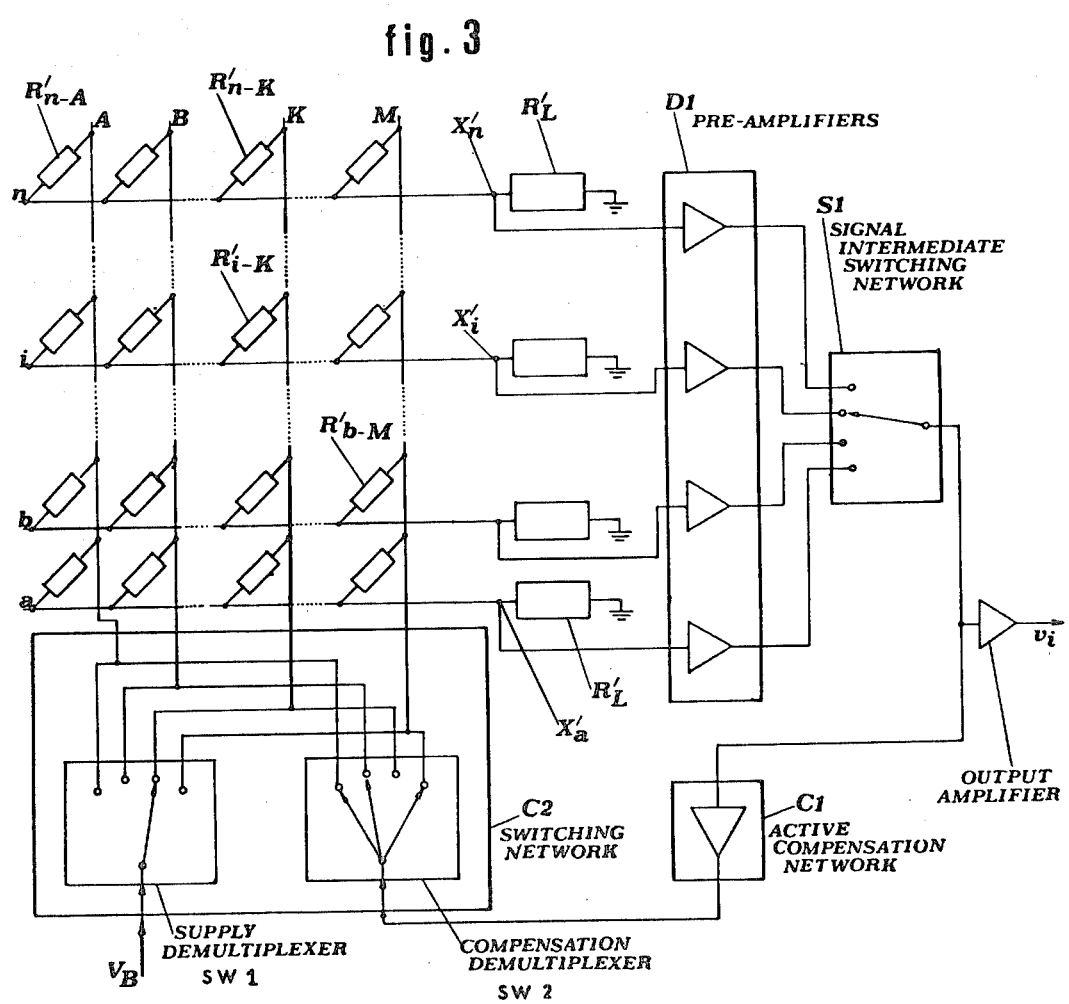
FIG. 3 is a schematic diagram of an electronic reading system for a high density sensor matrix of photoresistive type, wherein no insulating element is provided between each sensor and the surrounding elements, in accordance with the present invention.

As evidenced in FIG. 3, which is clearly different from a conventional matrix according to FIG. 1, the novel system of addressing comprises sensors $R'_{a-A}$, $R'_{a-B}$ ... $R'_{b-A}$, $R'_{b-B}$ ..., wherein one end of the photoresistor is directly connected to the proper row of the matrix and the other end is connected with the respective column, no physical elements of switching being provided as intermediate elements.

Similar to FIG. 1, the end of each row which is directed to the reading system is connected with a resistive element $R'_L$, the resistance being equal for all the rows a, b, .... A point $X_a$, $X_b$ ... of the rows is selected to take out the information from one of the sensors, e.g. $R'_{i-K}$ relating to the row i and column K, to be addressed.

It may be assumed, for example, that the scanning operation desires to interrogate the sensor $R'_{i-K}$ and detect the voltage $v_{i-K}$ in point $X_i$. The addressing and reading system in accordance with the present invention provides, first of all, power amplification of the $v_{i-K}$ voltage, by means of pre-amplifying units D1 of low-noise type which are realized by a hybrid technology and placed very near the sensors of the matrix, so that the noise figure will be particularly low, as the output noise voltage may also be $<20\mu$ VRMS.

The so amplified voltage $v_{i-K}$ is then passed to a switching and compensation system S1-C1. This is provided by an intermediate signal switching network S1 and an active compensation network C1, the scope of which is to recover the losses due to gain error of the preamplifying units D1, as well as the voltage drops localized on the equivalent resistors of the switching devices of intermediate network S1, so that voltage $v_{i-K}$ may be restored to its value as detected at the node $X_i$. The restored voltage $v_{i-K}$ so reintegrated is then sent to the remaining (m−1) columns through the switching network C2, as the column K which has been selected for addressing and reading is connected with the supply voltage through C2.

It should be clear to those skilled in the art that, at the reading moment $t_i$, the row i will have (m−1) sensors R' with an equal voltage at their ends, while sensor $R'_{i-k}$ which is the only one selected for reading has a voltage equal to the divided voltage between same and the common load resistor $R_L$.

That operative condition may be considered like the assignment of an impedance equivalent to infinity (practically, an impedance of a very high value) to the [n=(m−1)] sensors not being selected for reading. That is, those non-selected sensors will make no effective contribution to the voltage output.

The structure, which naturally should be nonoscillating, spends a finite time to reach the equilibrium state. Referring to common values of the parameters which characterize the equivalent circuits of the active components used in the circuit, such a time was found to be shorter than one $\mu$sec, which time is more than acceptable for usual practical purposes.

On the basis of practical experiments, it may also be shown that, by improving a hybrid complex of circuit structures by means of active components having optimum features, the matrix density may be $>>1000$ for each structure and the number of information wires as well as the complexity of the structure in its whole may consequently reach a reduction of about 97%. This result is very remarkable and favors the embodiment of sensor mosaics of high density, wherein photoresistive sensors of a self-scanning type may be used with built-in highly efficient circuit system of preamplification.

On the basis of principles forming the present invention, it is furthermore possible to reach high densities of mosaics of photoresistive elements for those applications wherein structures with two or more component subarrays are required, each substructure having a limited density of photoresistive elements. In this manner, however, the circuit structures will be a little more complex. There is, however, the advantage of providing systems having a remarkable degree of functionality and above all a high reliability. For example, the isolation between sensors pertaining to the same row is found to be very high, and the isolation between sensors of different rows is even higher.

In other embodiments, when the highest isolation is desired between sensors of same row, it was found advantageous to provide matrix structures wherein the number of rows and the number of columns are different to each other, that is $m \neq n$, and the former may be greater than the latter or vice versa.

It is noted that switching devices S1, SW1 and SW2 need not operate in perfect unison. Only the SW1 and SW2 subunits must operate in unison e.g. by means of complementary control device (not shown) with the same clock timing. Further, the plural contacts of the switching device SW2, the compensation de-multiplexer, is selectively switched by means of digital logic devices (not shown).

What is claimed:

1. An electronic addressing system to read a matrix of optical-electronic elements wherein:
    (a) said matrix is bi-dimensional and comprises only said optical-electronic elements arranged according to a row-column structure, without any auxiliary switching or shifting means arranged within said matrix, one end of each one of said elements being connected to a corresponding row conductor, the other end of each one of said elements being connected to a corresponding column conductor; and, comprising
    (b) switching means having a first section and a second section and being coupled to and external to said matrix of optical-electronic elements for selecting an individual one of said optical-electronic elements, said first section selecting a row and said second section selecting a column of said matrix, and
    (c) active compensation circuit means between said first section and said second section of said switching means for selectively reading said optical-electronic elements in a desired sequence, the first section of said switching means providing an input signal to said compensation circuit means from the row of said individual one of said optical-electronic elements, said compensation circuit means providing a compensation signal from said input signal, and wherein said second section applies a predetermined voltage to the column of a selected individual one of the optical elements while applying said compensation signal to the other columns of said matrix, said compensation signal restoring voltages to the points of the matrix associated with said other columns so as to equalize voltages among optical-electronic elements in the row of said individual one of said optical-electronic elements.

2. An electronic addressing system as claimed in claim 1, wherein said optical-electronic elements of the matrix are deposited upon a substrate of dielectric material.

3. An electronic addressing system as claimed in claim 1, wherein said matrix comprises an (n×m) array of optical-electronic elements, wherein n is the number of rows, and m is the number of columns in the matrix, and wherein the product of n×m is greater than 1,000.

4. An electronic addressing system as claimed in claim 1, wherein said matrix comprises an (n×m) array of optical-electronic elements, wherein n is the number of rows and m is the number of columns in the array, and wherein n is not equal to m.

5. An electronic addressing system as claimed in claim 1, wherein each row of said matrix comprises m photosensors, (m−1) of which are coupled to receive positive feedback from said active compensation circuit means in the desired moment $t_i$ when no information is requested from the (m−1) rows, and wherein said switching means selects for readout a single element on the selected row, which is not coupled to receive positive feedback in the desired moment $t_i$.

6. An electronic addressing system as claimed in claim 1, wherein said switching means in combination with said active compensation circuit means provide sequential scanning and self-scanning of said optical-electronic elements.

7. A method for addressing a matrix of optical-electronic elements, wherein there are no switching or shifting means within said matrix, comprising the steps of:
(a) irradiating the matrix, and detecting in the moment $t_i$ the information voltage ($v_{i\text{-}K}$) relating to photoresistive element ($R'_{i\text{-}K}$) which is connected with row (i) and column (K), the voltage ($v_{i\text{-}K}$) being detected at node ($X'_i$) of row (i);
(b) amplifying the information voltage ($v_{i\text{-}K}$) and supplying the amplified voltage to an intermediate signal switching network (S1) to provide an output signal;
(c) compensating the amplified information signal by an active network (C1) to recover losses in the information voltage ($v_{i\text{-}K}$), and to restore the information voltage to the value it had at the node ($X_i$);
(d) transfering the restored information voltage ($v_{i\text{-}K}$) to the columns which are distinct from column (K) which is selected for reading.

8. A method for addressing a matrix as claimed in claim 7, further comprising the step of:
(e) providing supply voltage ($V_B$) to the column (K) which is selected for reading, during the moment $t_i$.

9. A method for addressing a matrix as claimed in claim 7, wherein the (m−1) sensors (R') which are not selected for reading present a sufficiently high equivalent impedance such that there will be no output voltage contributions from these sensors, and wherein the output voltage from sensor ($R'_{i\text{-}K}$) is a predetermined portion of the supply voltage ($V_B$).

10. An electronic addressing system as claimed in claim 1, wherein the matrix is placed at a cryogenic temperature.

11. An addressing system for a matrix of optical-electronic elements, wherein:
(a) said matrix consists of optical-electronic elements arranged in an array in accordance with a row-column structure, row conductor means, column conductor means, each of said optical-electronic elements having two ends, one end of each of said optical-electronic elements being directly connected to an associated row conductor means, and the other end of each of said optical-electronic elements being directly connected to an associated column conductor means; and comprising
(b) switching means external to said matrix of optical-electronic elements and associated with said row conductor means and column conductor means, for selecting individual ones of said optical-electronic elements; and wherein
said switching means has a first section connecting with the columns of said matrix and a second section connecting with the rows of said matrix; said system further comprising
active compensation circuit means coupled between said first section and said second section of said matching means, the first section of said switching means providing an input signal to said compensation circuit means from the row of said individual one of said optical-electronic elements, said compensation circuit means providing a compensation signal from said input signal, and wherein said second section applies a predetermined voltage to the column of a selected individual one of the optical elements while applying said compensation signal to the other columns of said matrix, said compensation signal restoring voltages to the points of the matrix associated with said other columns so as to equalize voltages among optical-electronic elements in the row of said individual one of said optical-electronic elements.

12. An addressing system as claimed in claim 11, wherein each of said optical-electronic elements is responsive to radiation for producing an output voltage, said switching means comprising means for selecting output voltages from said optical-electronic elements.

13. An addressing system as claimed in claim 1, further comprising supply voltage means, means within said second section for selectively coupling said supply voltage to said column conductor means, and a load resistor coupled to each of said row conductor means, said optical-electronic elements comprising photo-resistors, whereby the output voltage from a selected photo-resistor is the divided voltage between the selected photo-resistor and corresponding load resistor.

* * * * *